US010763932B2

(12) United States Patent
Pitakdumrongkija

(10) Patent No.: US 10,763,932 B2
(45) Date of Patent: Sep. 1, 2020

(54) BASE STATION APPARATUS, WIRELESS COMMUNICATION SYSTEM, METHOD AND NON-TRANSITORY STORAGE MEDIUM

(71) Applicant: NEC Corporation, Minato-ku, Tokyo (JP)

(72) Inventor: Boonsarn Pitakdumrongkija, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 16/463,444

(22) PCT Filed: Dec. 8, 2016

(86) PCT No.: PCT/JP2016/086588
§ 371 (c)(1),
(2) Date: May 23, 2019

(87) PCT Pub. No.: WO2018/105084
PCT Pub. Date: Jun. 14, 2018

(65) Prior Publication Data
US 2019/0319687 A1  Oct. 17, 2019

(51) Int. Cl.
*H04B 7/06* (2006.01)
*H04B 17/318* (2015.01)
(Continued)

(52) U.S. Cl.
CPC ......... *H04B 7/0617* (2013.01); *H04B 7/0404* (2013.01); *H04B 7/0408* (2013.01);
(Continued)

(58) Field of Classification Search
CPC .. H04B 17/318; H04B 7/0404; H04B 7/0408; H04B 7/0617; H04W 72/085;
(Continued)

(56) References Cited

U.S. PATENT DOCUMENTS 8,571,567 B2   10/2013  Nishio
9,215,733 B2   12/2015  Nishio
(Continued)

FOREIGN PATENT DOCUMENTS

JP   2010081653 A   4/2010
JP   2013165509 A   8/2013
(Continued)

OTHER PUBLICATIONS

Kang (WO/2015/115706 A1), A method for transmitting reference signal based on adaptive antenna scaling in wireless communication system, published on Aug. 6, 2015.*
(Continued)

*Primary Examiner* — Siu M Lee

(57) ABSTRACT

A base station calculates at least a metric representing a signal quality of a pilot signal transmitted from a user terminal (UT), categorizes the UT into two types based on the metric, for a first type, performing beamforming on the antennas to a predetermined number of directions and then performing channel estimation for the beamformed directions, while for a second type UT, performing channel estimation without performing beamforming on the antennas.

10 Claims, 9 Drawing Sheets

(51) Int. Cl.
H04B 7/0404 (2017.01)
H04B 7/0408 (2017.01)
H04W 72/08 (2009.01)
H04W 72/12 (2009.01)

(52) U.S. Cl.
CPC ........ *H04B 17/318* (2015.01); *H04W 72/085* (2013.01); *H04W 72/1231* (2013.01)

(58) Field of Classification Search
CPC ............. H04W 72/1231; H04W 72/08; H04W 72/1226; H04W 72/1268; H04W 72/1289
See application file for complete search history.

(56) References Cited

U.S. PATENT DOCUMENTS

| | | | |
|---|---|---|---|
| 2007/0207730 A1* | 9/2007 | Nguyen | H01Q 1/246 455/39 |
| 2008/0070610 A1 | 3/2008 | Nishio | |
| 2014/0056285 A1 | 2/2014 | Nishio | |
| 2015/0236772 A1* | 8/2015 | Hammarwall | H04B 7/0617 370/329 |
| 2016/0344525 A1 | 11/2016 | Kang et al. | |
| 2017/0141823 A1* | 5/2017 | Fodor | H04B 7/0404 |

FOREIGN PATENT DOCUMENTS

| | | |
|---|---|---|
| JP | 2015082664 A | 4/2015 |
| WO | 2015/115706 A1 | 8/2015 |

OTHER PUBLICATIONS

"3rd Generation Partnership Project; Technical Specification Group Radio Access Network; Evolved Universal Terrestrial Radio Access (E-UTRA); Physical layer procedures (Release 11)", 3GPP TS 36.213 V11.8.0, Sep. 2014, 182 pages total.

John C. Hancock et al., "Signal Detection Theory", McGRAW-Hill Book Company, 1966, 253 pages total.

Ruifeng Zhang, "Scheduling for Maximum Capacity in SDMA/TDMA Networks", IEEE International Conference on Acoustics, Speech, and Signal Processing (ICASSP), pp. 2141-2144, 2002, 4 pages total.

Nathan Blaunstein et al., "Radio Propagation and Adaptive Antennas for Wireless Communication Links", Terrestrial, Atmospheric and Ionospheric, Wiley Interscience, a John Wiley & Sons, Inc. Publication, 2007, 64 pages total.

International Search Report dated Aug. 23, 2017 issued by the International Searching Authority in International Application No. PCT/JP2016/086588.

Written Opinion dated Aug. 23, 2017 issued by the International Searching Authority in International Application No. PCT/JP2016/086588.

Office action in counterpart JP patent application 2019-530853, dated Jul. 16, 2020.

* cited by examiner

BASE STATION APPARATUS, WIRELESS COMMUNICATION SYSTEM, METHOD AND NON-TRANSITORY STORAGE MEDIUM

This application is a National Stage Entry of PCT/JP2016/086588 filed on Dec. 8, 2016, the contents of all of which are incorporated herein by reference, in their entirety.

FIELD

The present invention relates to a base station apparatus, wireless communication system, method and non-transitory storage medium.

BACKGROUND

Exploding growth in mobile broadband usage has created a large number of new applications. Social networking is one of examples wherein many users rely on a mobile network to access the Internet. In such an application, it has been observed that an amount of downlink traffic from the Internet to users and an amount of uplink traffic from users to the Internet are relatively equal. This breaks traditional view on the Internet traffic that downlink load is typically heavier than uplink load, prompting mobile network operators to realize importance of optimizing network thereof for increasing amount of uplink traffic. Mobile network operators have begun to recognize the uplink as a key to potential new revenues, which comes, for examples, from applications such as cloud storage, Internet-of-Things (IoT), and intelligent traffic system (ITS). Therefore, for future of mobile broadband, optimizing uplink data communication performance is one of keys to effectively utilize limited radio resources and to maximize operational profit. One approach that has already been adopted in standards such as Third Generation Partnership Project (3GPP) Long-Term Evolution (LTE) described in non-patent literature (NPL) 1 is an employment of multiple antennas at both base station (BS) and user terminal (UT) to enable multiple-input multiple-output (MIMO) communications in both downlink and uplink, thereby improving efficiency of spectral usage in a radio network system.

Generally, in order for a base station with multiple-antennas to receive uplink data transmission from a user terminal, the base station performs following steps.

First, the base station estimates uplink channel by using a pilot signal transmitted from the user terminal. The pilot signal is also called Sounding Reference Signal (SRS) in LTE terminology. FIG. 7 illustrates a typical procedure for channel estimation described in NPL2. The typical channel estimation procedure simply multiplies a received signal received at each antenna with an inverse of the pilot signal.

Then, the base station schedules uplink data transmission of the user terminal based on the channel estimate.

Finally, the base station detects uplink data transmission from the user terminal.

Scheduling and detection of uplink data transmission have been well studied and regarding thereto, reference may be made to, for example, NPL3.

When a user terminal is power-limited and is under influence of deep-fading propagation environment, level of pilot signal transmitted from the user terminal and received at each antenna of a base station could be lower than level of noise. In that case, a typical channel estimation procedure in the base station would give poor channel estimation accuracy, resulting in degradation of uplink data reception performance such as high bit error rate and low throughput.

An example of typical channel estimation procedures schematically illustrated in FIG. 7 will be later described.

A beamforming technique can be implemented in a base station prior to performing channel estimation in order to increase level of pilot signal received over level of noise. This can contribute to improvement of channel estimation accuracy and uplink data reception performance. Combination between beamforming and channel estimation is denoted herein as beamforming channel estimation procedure.

FIG. 8 schematically illustrates an example of typical beamforming channel estimation procedure. In a base station 10, there are provided, as a beamfomer, M multipliers 109, for each of N spatial directions, and N adders 110, where M is a predetermined integer not less than 2 and N is a predetermined positive integer. M multipliers 109 multiply signals respectively received at M antennas (multiple antennas) 101 with corresponding weighting coefficients to produce M weighted results. Each of adders 110 sums the M weighted results from M multipliers 109, thereby amplifying an energy of the pilot signal in a specified spatial direction $\theta_{Si}$ (i=, 1 . . . , N). Methods for determining weighting coefficients such as phased array method have been well studied and reference may be made to, for example, NPL4. The beamformed received signal can then be multiplied with an inverse of the pilot signal: $1/X_p(k)$ where k is a subcarrier index to obtain a channel estimate $\tilde{H}_{si}(k)$ for a specified spatial direction $\theta_{Si}$ (i=, 1 . . . , N).

In practice, the beamforming channel estimation procedure usually selects a limited number of spatial directions to obtain channel estimates, because of computational complexity constraint. Also, a limited number of spatial directions $\theta_{Si}$ (i=, 1 . . . , N) are selected in order from the one that gives the largest beamformed received signal's energy to ensure the highest channel estimation accuracy. In other words, the beamforming channel estimation procedure introduces additional computational complexity to the typical channel estimation procedure in order to selectively improve channel estimates for the limited number of spatial directions. This is in contrast to the typical channel estimation procedure that gives unbiased channel estimates for all spatial directions at once.

[NPL 1]
3GPP, "TS 36.213 v11.8.0: E-UTRA physical layer procedures (Release 11)," 3GPP, September 2014.

[NPL 2]
J. C. Hancock and P. A. Wintz, "Signal detection theory," McGraw-Hill, 1966.

[NPL 3]
R. Zhang, "Scheduling for maximum capacity in SDMA/TDMA networks," IEEE International Conference on Acoustics, Speech, and Signal Processing (ICASSP), 2002.

[NPL 4]
N. Blaunstein and C. Christodoulou, "Radio propagation and adaptive antennas for wireless communication links," John Wiley & Sons, 2007.

SUMMARY

The disclosures of NPLs 1-4 given above are hereby incorporated in their entirety by reference into this specification.

The following analysis is made by the inventor of the present invention.

The beamforming channel estimation procedure, although being effective in increasing level of pilot signal over noise and improving channel estimates for limited number of spatial direction, unnecessarily limits uplink data reception performance when a propagation environment has a relatively large channel gain compared to a noise. This is because the beamforming channel estimation procedure only gives partial channel state information (CSI), which would result in suboptimal uplink data transmission scheduling decision as compared to when a full CSI is available.

In this case, the typical channel estimation could well be employed instead, since the typical channel estimation provides unbiased channel estimates for all spatial directions at once, which are equivalent to a full CSI.

Therefore, a technique that can allow a base station to adaptively select channel estimation procedure based on a condition of propagation environment between the base station and a user terminal would well contribute to always ensure uplink data reception performance. However, currently such a technique has not yet been established.

Accordingly, it is an object of the invention to provide an apparatus, system, method and non-transitory storage medium storing a program, each enabling a base station to ensure channel estimation accuracy and improve uplink data reception performance.

According to a first aspect of the disclosure, there is provided a base station apparatus comprising:

a plurality of antennas;

a receiver that receives a signal from the plurality of the antennas;

a processor connected to the receiver; and a memory connected to the processor and storing program instructions, wherein the processor, when executing the program instructions stored in the memory, calculates at least a first metric representing a signal quality of a pilot signal transmitted from a terminal and received by the plurality of the antennas;

categorizes the terminal, based on the first metric; and for the terminal categorized as a first type performs beamforming on the plurality of the antennas to a predetermined number of directions and then performs channel estimation for the beamformed directions, and, for the terminal categorized as a second type performs channel estimation without performing beamforming on the plurality of the antennas.

According to a second aspect of the disclosure, there is provided a method by a base station with a plurality of antennas, comprising:

calculating at least a first metric representing a signal quality of a pilot signal transmitted from a terminal and received by the plurality of the antennas;

categorizing the terminal based on the first metric; and performing, for the terminal categorized as a first type, beamforming on the plurality of the antennas to a predetermined number of directions and then performing channel estimation for the beamformed directions, while, for the terminal categorized as a second type, performing channel estimation without performing beamforming on the plurality of the antennas.

According to a third aspect of the disclosure, there is provided a program causing a computer composing a base station with a plurality of antennas, to execute:

calculating at least a first metric representing a signal quality of a pilot signal transmitted from a user terminal and received by the antennas;

categorizing the terminal based on the first metric; and for the terminal categorized as a first type, performing beamforming on the antennas to a predetermined number of pilot signal directions, and then performing channel estimation for the beamformed directions, while for the terminal categorized as a second type, performing channel estimation without performing beamforming on the antennas.

According to a fourth aspect of the disclosure, there is provided a non-transitory computer-readable storage medium in which the program according to the above described third aspect of the disclosure is stored.

According to the disclosure, a base station is enabled to ensure degradation of channel estimation accuracy and improve uplink data reception performance.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

The following describes exemplary embodiments of the present invention with reference to the drawings. First, a mobile communication system and apparatus, which are used in common for describing embodiments, are explained with reference to FIGS. 1 and 2.

Figure 1:
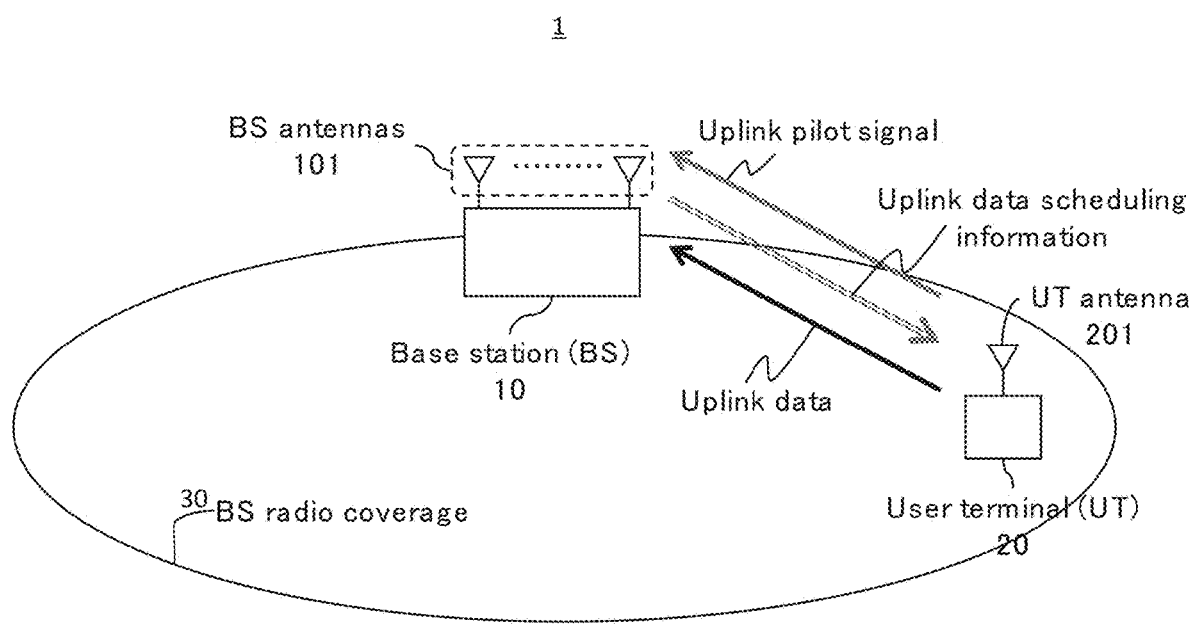
FIG. 1 is a diagram illustrating an example of a mobile communication system according to an exemplary embodiment.

FIG. 1 illustrates an example of a wireless communication system (mobile communication system) according to an exemplary embodiment. Referring to FIG. 1, the mobile communication system 1 includes a base station (also denoted as BS) (10) with a plurality of antennas (101) and a user terminal (also denoted as UT) (20) with a single antenna (201). The plurality of antennas (101) of the base station (10) may be also termed as BS antennas (101). Note that in FIG. 1, the user terminal (20) with a single antenna (201) is given only for simplicity sake. Exemplary embodiments are, as a matter of course, not limited to the user terminal 20 with a single antenna 201 and can be applied to a user terminal 20 with any number of antennas. User terminal and terminal may be interchangeably used.

The base station (10) provides wireless access to the user terminal (10). The user terminal (20), residing in a radio coverage (30) of the base station (10) (also denoted as BS radio coverage), can communicate with the base station (10) in both uplink and downlink directions. More specifically, the user terminal (20) is configured to transmit an uplink pilot signal to the base station (10). The uplink pilot signal may correspond to SRS (Sounding Reference Signal) in LTE (Long Term Evolution) system. SRS is a reference signal transmitted by a user terminal (an user equipment (UE) for LTE) in an uplink direction which is used by the eNodeB (a base station for LTE) to estimate an uplink channel quality over a section of a channel bandwidth. SRS can be used by eNodeB to do frequency selective scheduling and link adaptation decision.

The base station (10) is configured to transmit uplink data scheduling information to the user terminal (20), based on a result of performing channel estimation on the uplink pilot signal. Then, the user terminal (20) can transmit uplink data to the base station (10) based on the received uplink data scheduling information.

Figure 2:
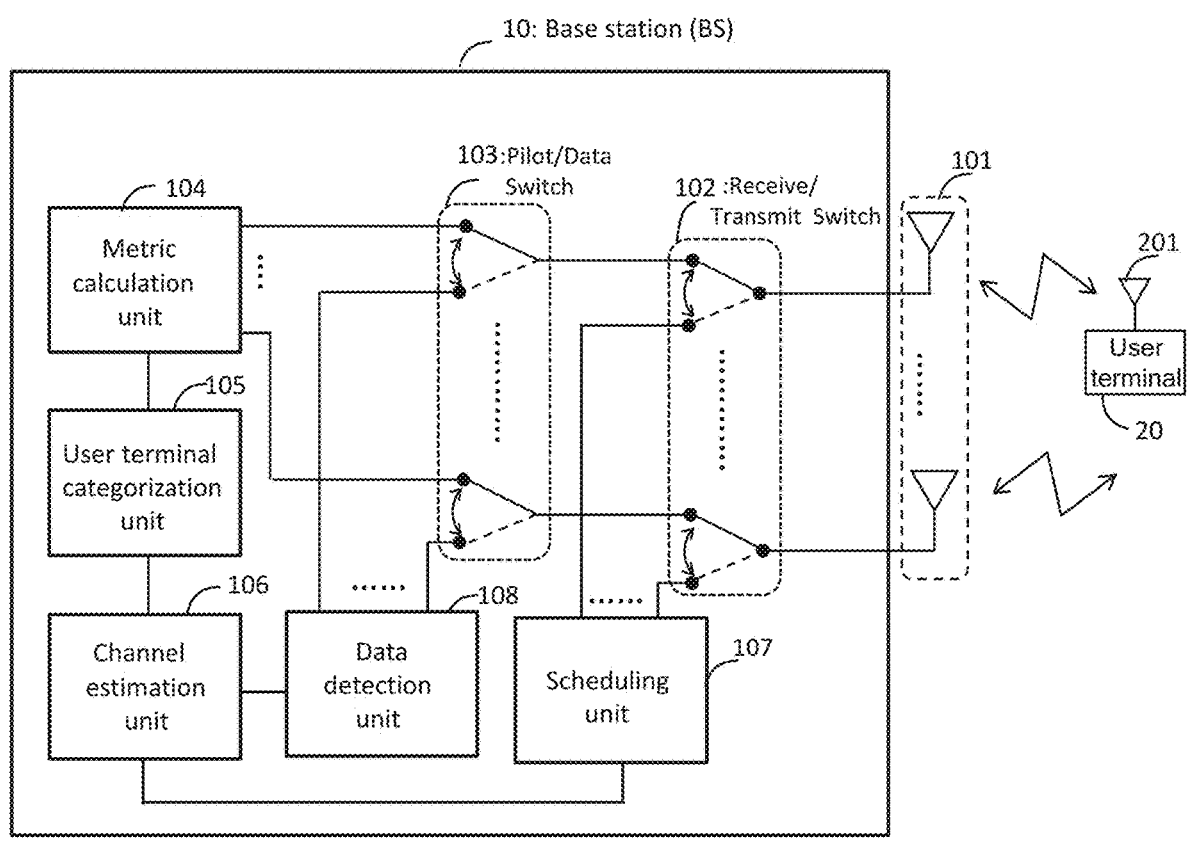
FIG. 2 is a diagram illustrating an example of an arrangement of a base station according to the exemplary embodiment.

FIG. 2 illustrates an example of an arrangement of the base station (10). The BS antennas (101) are used for both receiving and transmitting from and to the user terminal (20), respectively. Selection between reception from the antennas (101) and transmission to the antennas (101) is controlled by a receive/transmit switch (102). Reception signal selected by the receive/transmit switch (102) is forwarded to a pilot/data switch (103) that de-multiplexes between reception of an uplink pilot signal and reception of uplink data.

On reception of an uplink pilot signal transmitted from the user terminal (20), the uplink pilot signal is forwarded by the pilot/data switch (103) to a metric calculation unit (104) that calculates at least one metric representing received SNR (Signal to Noise Ratio) of the uplink pilot signal.

A user terminal categorization unit (105) categorizes the user terminal (20), from which the pilot signal has been received, into two types, based on the metric calculated by the metric calculation unit (104).

A channel estimation unit (106), depending on a type of the user terminal (20), performs a channel estimation procedure.

After a channel estimate is obtained by the channel estimation unit (106), a scheduling unit (107) performs user data scheduling (uplink data transmission of the user terminal (20)).

Scheduling results are summarized as uplink data scheduling information. The base station (10) transmits the uplink data scheduling information to the user terminal (20) through the antennas (101). The uplink data scheduling information may contain information about assigned physical radio resources, precoding vector/matrix, and modulation and coding scheme (MCS).

The uplink data scheduling information corresponds to physical resource block (PRB) assignment, precoding matrix indicator (PMI), and MCS index in LTE terminology, respectively.

The uplink data scheduling information is used by the user terminal (20) in order to transmit uplink data to the base station (10).

Upon reception of uplink data transmitted from the user terminal 20, a data detection unit (108) in the base station (10) performs signal detection. The data detection unit (108), in performing the signal detection, demodulates and decodes the received signal at assigned physical radio resources. Processing result of the signal detection is binary data that are forwarded to a higher layer protocol entity in communication protocol. In LTE system, reception of uplink data and signal detection are performed in a physical (PHY) layer and a medium access control (MAC) layer, respectively. Then, binary data from the MAC layer entity of a base station (eNodeB) are forwarded to a Radio Link Control (RLC) layer entity thereof.

It is noted here that FIG. 2 illustrates function blocks and signal paths relevant to the exemplary embodiment and other well known fundamental functions of the base station (10) are omitted.

The following describes two exemplary embodiments in which a communication system and a base station have arrangements respectively same as described with reference to FIGS. 1 and 2.

First Exemplary Embodiment

In a first exemplary embodiment, the base station (10) first receives an uplink pilot signal from the user terminal (20).

The base station (10) calculates a first metric which represents SNR of the received uplink pilot signal when it is assumed that beamforming is not applied to the BS antennas (101).

The base station (10) compares the first metric with a predetermined threshold value. The base station (10), using a comparison result, categorizes the user terminal (20) into two types. More specifically when the first metric is less than the predetermined threshold value, the base station (10) categorizes the user terminal (20) into a first type. Otherwise, the base station (10) categorizes the user terminal (20) into a second type.

The base station (10) then performs channel estimation based on the type of the user terminal (20).

If the user terminal (20) is of the first type, the base station (10) first performs beamforming on the BS antennas (101) to a predetermined number of received pilot signal directions.

After performing the beamforming, the base station (10) calculates channel estimates for the beamformed directions.

On the other hand, if the user terminal (20) is of the second type, the base station (10) calculates channel estimates without performing beamforming on the BS antennas (101).

The base station (10) then schedules uplink data transmission based on the channel estimates, and transmits the uplink data scheduling information to the user terminal (20).

Upon reception of corresponding uplink data from the user terminal (20), the base station (10) performs signal detection to obtain binary data.

Figure 3:
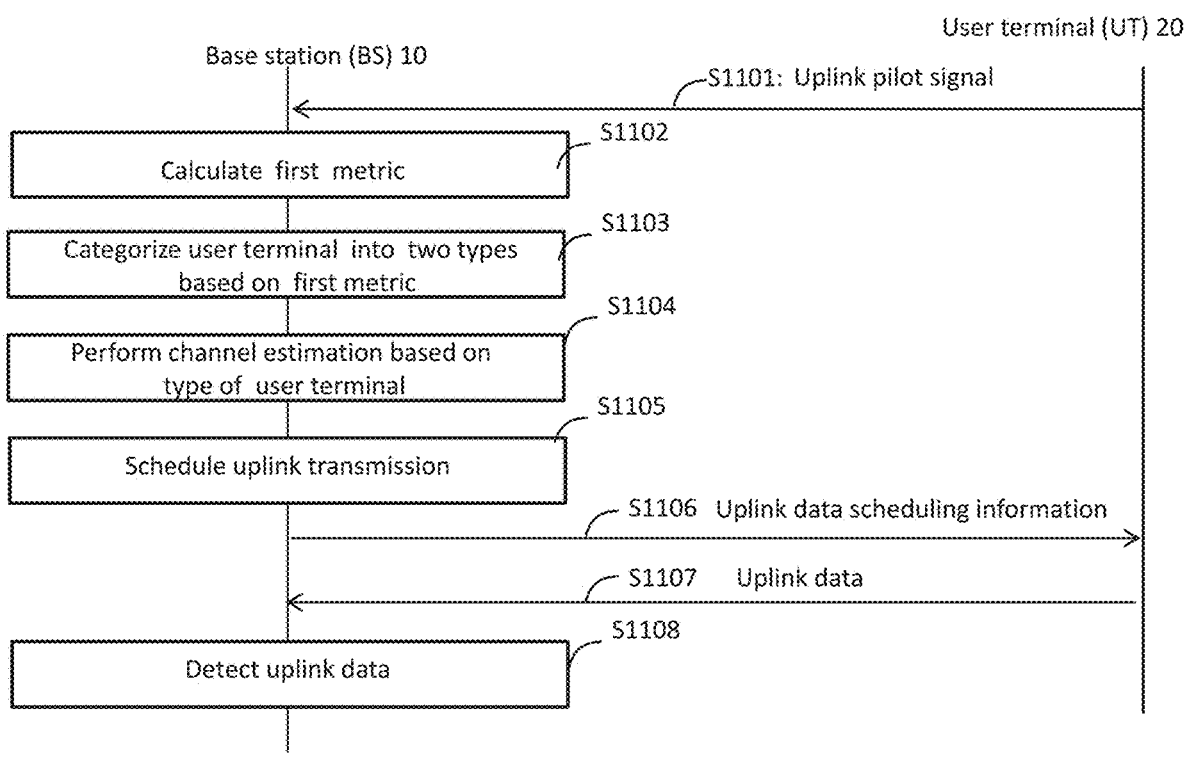
FIG. 3 is a diagram schematically illustrating a sequence of operations in a first exemplary embodiment.
Figure 4:
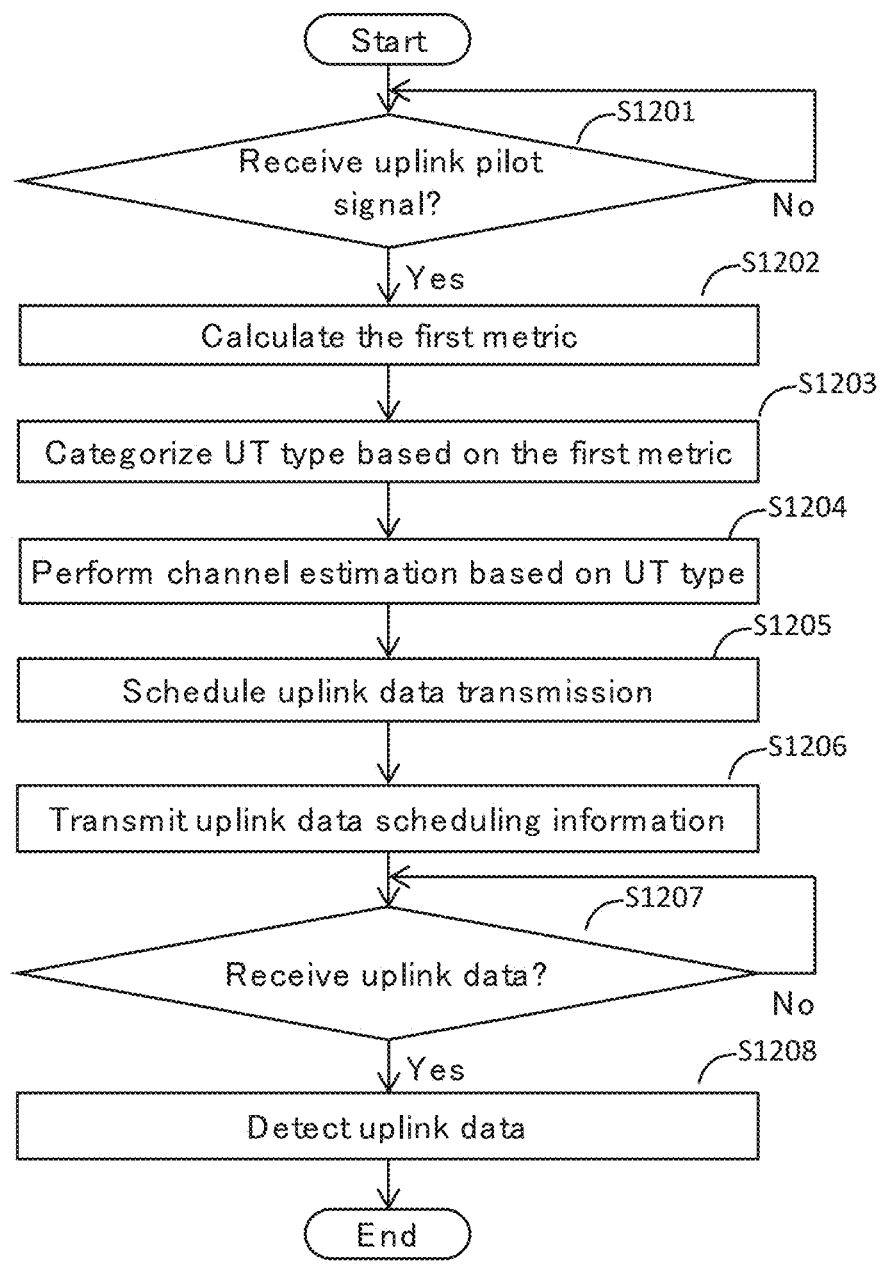
FIG. 4 is a flow diagram illustrating an example of operations of a base station in a first exemplary embodiment.

The following describes the first exemplary embodiment in detail with references to FIGS. 3 and 4. FIG. 3 illustrates operations of the base station (10) and the user terminal (20).

The user terminal (20) transmits an uplink pilot signal to the base station (10) (S1101).

The base station (10) then calculates the first metric (S1102). The first metric represents a received SNR of the uplink pilot signal in a case wherein beamforming is not applied to the BS antennas (101).

Figure 7:
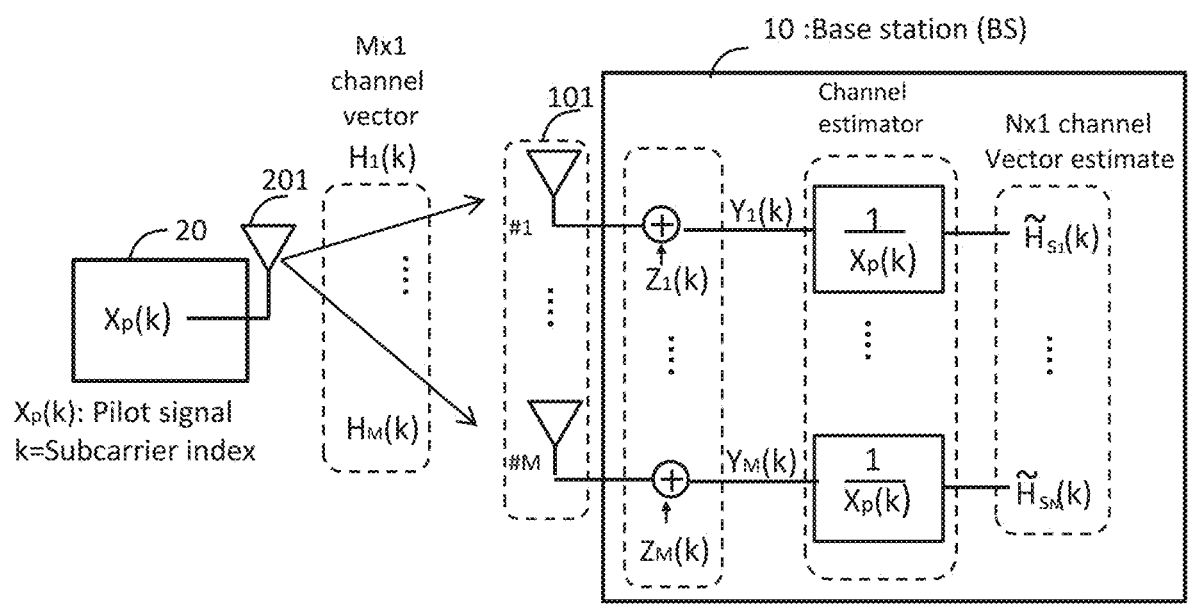
FIG. 7 is a diagram illustrating an example of channel estimation procedure.

FIG. 7 illustrate the case wherein beamforming is not applied to the BS antennas (101) in the base station (20).

The first metric denoted by $\gamma_{1st}(k)$ is given as follows.

$$\gamma_{1st}(k) = \frac{\langle |y(k)|^2 \rangle - \sigma_z^2 M}{\sigma_z^2 M} \quad \text{(Eq. 1)}$$

$$y(k)=h(k)X_p(k)+z(k) \quad \text{(Eq. 2)}$$

$$y^T(k)=[Y_1(k) \ldots Y_M(k)] \quad \text{(Eq. 3)}$$

$$h^T(k)=[H_1(k) \ldots H_M(k)] \quad \text{(Eq. 4)}$$

$$z^T(k)=[Z_1(k) \ldots Z_M(k)] \quad \text{(Eq. 5)}$$

$$\sigma_z^2 = \langle |Z_m(k)|^2 \rangle, \text{ where } m=1,\ldots,M \quad \text{(Eq. 6)}$$

where, $\langle\ \rangle$ denotes ensemble average and $|\ |$ denotes vector norm. $X_p(k)$ is a pilot signal transmitted from the user terminal (20) where k is a subcarrier index.

Superscript T is a transpose operator.

$Y_i(k)=h_i(k)X_p(k)+Z_i(k)$ (i=1~M) is a received pilot signal received on an i-th antenna the BS antennas (101) and is an i-th-element of a M×1 vector y(k).

$|y(k)|^2$ is a signal power of a received pilot symbol.

$H_i(k)$ (i=1~M) is an i-th element of M×1 channel vector h(k).

$Z_i(k)$ (i=1~M) is a noise on an i-th antenna the BS antennas (101) and is an i-th element of M×1 noise vector z(k).

$\sigma_z^2$ is a noise power per antenna per subcarrier. The noise power can be derived from either noise figure specification of the base station (10) or from noise estimation process performed by the base station (10) during no communication period, for example.

$\sigma_x^2$ multiplied by M, i.e., $\sigma_z^2 M$ is a noise power for the BS antennas (101) for subcarrier index k.

After obtaining the first metric, the base station (10) compares the first metric with a predetermined threshold, and categorizes the user terminal into two types based on the comparison result (S1103).

A predetermined threshold represents a received SNR of the uplink pilot signal that is the smallest that allows the base station (10) to perform typical channel estimation procedure as illustrated in FIG. 7. That is, the base station (10) calculates channel estimates without performing beamforming on the BS antennas (101). The predetermined threshold may derived by performing threshold value optimization prior to an actual system operation.

Let us denote the user terminal type and the predetermined threshold as $UT_{type}$ and $\gamma_{threshold}$, respectively. $UT_{type}$ can be expressed as follows.

$$UT_{type} = \begin{cases} UT_{1st}, & \gamma_{1st}(k) < \gamma_{threshold} \\ UT_{2nd}, & \gamma_{1st}(k) \geq \gamma_{threshold} \end{cases} \quad \text{(Eq. 7)}$$

where $UT_{1st}$ and $UT_{2nd}$ are the first type and the second type, respectively.

Next, the base station (10) performs channel estimation based on $UT_{type}$ (S1104).

If $UT_{type}=UT_{1st}$, the base station (10) performs beamforming channel estimation procedure.

Figure 8:
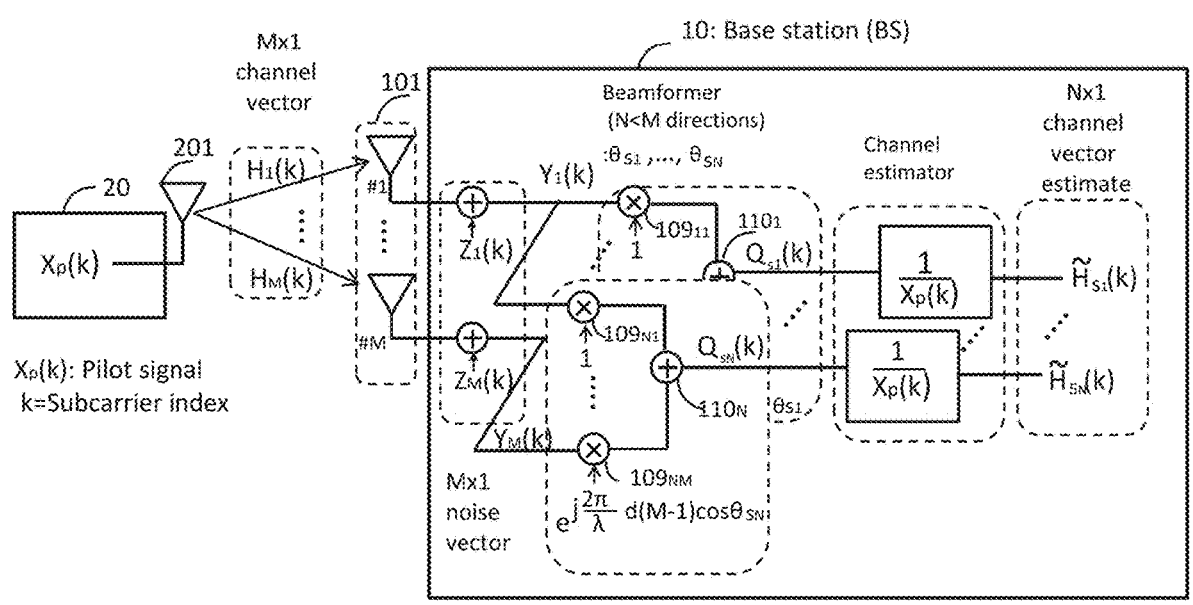
FIG. 8 is a diagram illustrating an example of channel estimation procedure.

Referring to FIG. 8, the beamforming channel estimation procedure of the base station (10) will be described. The base station (10) first performs beamforming on the BS antennas (101) to a predetermined number (N) of received pilot signal directions: $\theta_{S_1}, \ldots, \theta_{S_N}$.

Then, the base station (10) calculates channel estimates for the predetermined number (N) of beamformed directions.

If $UT_{type}=UT_{2nd}$, the base station (10) performs the typical channel estimation procedure as described with reference to FIG. 7. That is, the base station (10) calculates channel estimates without performing beamforming on the BS antennas (101).

The following describes two examples for the cases of $UT_{type}=UT_{1st}$ and $UT_{type}=UT_{2nd}$.

For the case of $UT_{type}=UT_{1st}$, let us consider the example as illustrated in FIG. 8.

N is assumed to be a predetermined number of beamformed received pilot signal directions. N is less than the number of antennas M in the BS antennas (101).

The predetermined number of directions is usually determined based on computational complexity constraint of a hardware. Given N, the beamforming channel estimation procedure performs first and second steps.

The first step is to determine N directions that have the largest levels of uplink pilot signal over noise.

The second step is to multiply a beamformed received signal with an inverse of the uplink pilot signal to obtain channel estimates.

The first step can be expressed as follows:

$$\{\theta_{S_1},\ldots,\theta_{S_N}\}=\{\text{Set of } N \text{ values of } \theta \text{ producing } N \text{ largest values of } |w^T(\theta)y(k)|^2\} \quad \text{(Eq. 8)}$$

where $\theta$ and $w^T(\theta)$ denote a beamformed angular direction measured from the plane parallel to the antenna array and a corresponding M×1 beamforming weight coefficient vector, respectively. For example, the first step, calculation of every value of $|w^T(\theta)y(k)|^2$ for every trial of $\theta$ and preserves only N number of $\theta$ (i.e., $\theta_{S_1},\ldots\theta_{S_N}$) that produce the N largest values of $|w^T(\theta)y(k)|^2$.

In FIG. 8, there is illustrated the specific example when the BS antennas (101) are assumed to be a uniform linear array, and are assumed to employ a phased array weighting method.

Therefore, $$w^T(\theta) = \left[1 \ldots \exp\left(j\frac{2\pi}{\lambda}d(M-1)\cos\theta\right)\right] \quad \text{(Eq. 9)}$$

where "exp" denotes an exponential function with a natural log base, d denotes a length of spacing between adjacent antennas in the array, $\lambda$ is a wavelength of the pilot signal and $j^2=-1$.

An output of an adder 110n (n=1, ..., N) is given as follows:

$$Q_{S_n}(k) = w^T(\theta_{S_n})y(k) = \sum_{i=1}^{M} \exp\left(j\frac{2\pi}{\lambda}d(i-1)\cos\theta_{S_n}\right) \times Y_i(k) \quad (n=1,\ldots,N) \quad \text{(Eq. 10)}$$

where n-th weight vector $w^T(\theta_{S_n})$ is obtained by substituting $\theta$ in Eq. 9 with n-th direction $\theta_{S_n}$.

$$w^T(\theta_{S_n}) = \left[1 \; \exp\left(j\frac{2\pi}{\lambda}d\cos\theta_{S_n}\right) \ldots \exp\left(j\frac{2\pi}{\lambda}d(M-1)\cos\theta_{S_n}\right)\right] \quad \text{(Eq. 11)}$$

A mathematical expression of the second step to obtain the N×1 channel estimate vector $\tilde{h}_S^T(k)=[\tilde{H}_{S_1}(k) \ldots \tilde{H}_{S_N}(k)]$ can be expressed as follows.

$$\tilde{H}_{s_n}(k) = \frac{w^T(\theta_{s_n})y(k)}{X_p(k)} = w^T(\theta_{s_n})h(k) + \frac{w^T(\theta_{s_n})z(k)}{X_p(k)}, \quad \text{(Eq. 12)}$$

where $n = 1, \ldots, N$

For the case of $UT_{type}=UT_{2nd}$, let us consider the example as illustrated in FIG. 7.

At the base station (10), the received signal at each antenna is directly multiplied with the inverse of the uplink pilot signal in order to obtain the channel estimates.

The mathematical expression of the M×1 channel estimate vector $\tilde{h}^T(k)=[\tilde{H}_1(k) \ldots \tilde{H}_M(k)]$ can be expressed as follows.

$$\tilde{H}_m(k) = H_m(k) + \frac{Z_m(k)}{X_p(k)} \quad \text{(Eq. 13)}$$

After the channel estimates are obtained, the base station (10) schedules uplink data transmission (S1105).

The base station (10) transmits uplink data scheduling information to the user terminal (20) (S1106).

The following describes the channel estimation operation of S1104.

The base station (10) first estimates per subcarrier a received signal-to-noise ratio (SNR) of future uplink data transmission based on obtained channel estimates.

Let us denote the received SNR per subcarrier as $\gamma_{data,est}(k)$, and assume that the base station (10) employs maximum ratio combining (MRC) reception in the uplink data detection process.

Maximal Ratio Combining (MRC) obtains weights w to maximize SNR. Assuming $w^H y(k)=w^H \tilde{h}(k)Xp(k)+w^H z(k)$, an estimate of received SNR is given as follows:

$$SNR = \frac{|w^H \tilde{h}(k)|^2}{<|w^H z(k)|^2>} = \quad \text{(Eq. 14)}$$

$$\frac{w^H Xp(k)\tilde{h}(k)\{Xp(k)\tilde{h}(k)\}^H w}{\langle w^H z(k)z(k)^H w\rangle} = \frac{|Xp(k)|^2(w^H \tilde{h}(k)\tilde{h}(k)^H w)}{w^H \langle z(k)z(k)^H\rangle w} =$$

$$\frac{\sigma_x^2 w^H |\tilde{h}(k)|^2 w}{\sigma_z^2 |w|^2} = \frac{\sigma_x^2 |\tilde{h}(k)|^2 |w|^2}{\sigma_z^2 |w|^2} = \frac{\sigma_x^2 |\tilde{h}(k)|^2}{\sigma_z^2}$$

where
a superscript H indicates an Hermitian operator (taking transpose and then complex conjugate),
$\tilde{h}(k)$ is either $\tilde{h}_S(k)$ as defined in Eq. 12 or $\tilde{h}(k)$ as defined in Eq. 13, depending the type of the user terminal, and
$\sigma_x^2$ is an average transmit signal power known in advance to the base station (10).

Accordingly, $\gamma_{data,est}(k)$ can be expressed as follows:

$$\gamma_{data,est}(k) = \begin{cases} \sigma_x^2 |\tilde{h}_s(k)|^2 / \sigma_z^2, & UT_{type} = UT_{1st} \\ \sigma_x^2 |\tilde{h}(k)|^2 / \sigma_z^2, & UT_{type} = UT_{2nd} \end{cases} \quad \text{(Eq. 15)}$$

Based on the received SNR (or SINR: Signal to Interference-plus Noise Ratio) estimate per subcarrier, the base station (10) then perform a search in order to determine combination of the number, physical locations, and MCS of assigned subcarriers that maximizes an amount of transmittable data with a predetermined relationship therebetween.

Using the result of the search, the base station (10) creates uplink data scheduling information to be transmitted to the user terminal (20).

In LTE system, predetermined relationship between an amount of transmittable data, and MCS and the number of assigned subcarriers are provided by a transport block size (TBS) table.

Search algorithms for finding an optimal combination such as exhaustive search or sequential search have also been extensively studied. Therefore, a detailed description thereof is omitted.

Next, the user terminal (20), upon reception of the uplink data scheduling information, transmits uplink data to the base station (10) (S1107).

The base station (10) then performs detection on the uplink data (S1108).

The following describes uplink data detection, using the above described channel estimation operation of S1104 and the scheduling operation of S1105.

The base station (10) first performs MRC reception on the received signal. Let us denote the MRC received signal as $r_{data}(k)$. $r_{data}(k)$ can be expressed as follows:

$$r_{data}(k) = \quad \text{(Eq. 16)}$$

$$\begin{cases} \frac{\tilde{h}_s^H(k)}{|\tilde{h}(k)|^2} W(\theta_{s_1}, \ldots, \theta_{s_N})(h(k)X(k)+z(k)), & UT_{type} = UT_{1st} \\ \frac{\tilde{h}_s^H(k)}{|\tilde{h}(k)|^2}(h(k)X(k)+z(k)), & UT_{type} = UT_{2nd} \end{cases}$$

$$W^T(\theta_{S_1}, \ldots, \theta_{S_N}) = [w(\theta_{S_1}) \ldots w(\theta_{S_N})] \quad \text{(Eq. 17)}$$

where Superscript H is a complex conjugate and transpose operator (Hermitian operator) and X(k) denotes and the uplink data.

$w(\theta_{S_n})$ (n=1, ... N) is a M×1 vector that is the same as that in Eq. 11.

$$w(\theta_{s1}) = \left[1 \; \exp\left(j\frac{2\pi}{\lambda}d\cos\theta_{s1}\right) \ldots \exp\left(j\frac{2\pi}{\lambda}d(M-1)\cos\theta_{s1}\right)\right]^T \ldots,$$

$$w(\theta_{sN}) = \left[1 \; \exp\left(j\frac{2\pi}{\lambda}d\cos\theta_{sN}\right) \ldots \exp\left(j\frac{2\pi}{\lambda}d(M-1)\cos\theta_{sN}\right)\right]^T$$

$\tilde{h}s(k)$ is N×1 vector and $W(\theta_{S1}, \ldots, \theta_{SN})$ is N×M matrix.

After the MRC reception, the base station (10) performs demodulation on $r_{data}(k)$, followed by decoding. Since details about demodulation and decoding are well known, the description is omitted for the sake of brevity.

It is noted that the application of the first exemplary embodiment is not limited to the examples described in the above. The essence of the first exemplary embodiment can be applied to various scenarios.

For example, for a user terminal with multiple antennas, the metric calculation unit 104 shall consider multiple uplink pilot signals from different antennas of the base station. The metric calculation unit 104 may calculate multiple metrics for the multiple uplink pilot signals first. Then, the metric calculation unit (104) may create one representative metric based on the multiple metrics by means such as statistical average. After that, the user terminal categorization unit (105) may perform categorization of the user terminal into two types based on the representative metric.

The channel estimation unit (106) performs channel estimation procedure according to the user terminal type in order to obtain channel estimates corresponding to multiple uplink pilot signals.

For scheduling and detection portions for the user terminal (20) with multiple antennas (101), the first exemplary embodiment may take into consideration of application of precoding vector/matrix implemented at the user terminal side in addition to assigned physical radio resources, MCS, and an amount of transmittable data. Also, reception scheme employed in the base station (10) may be changed in correspondence with use of precoding vector/matrix at the user terminal (20).

Another scenario of importance is that of multiple user terminals (20) served by the same base station (10). In this case, the metric calculation unit (104) of the first exemplary embodiment may handle multiple uplink pilot signals from different user terminals. Then, the operations of user terminal type categorization and channel estimation may be performed separately for each user terminal, using the corresponding metric.

For scheduling and detection parts for the scenario with multiple user terminals, the first exemplary embodiment may consider number and identity of multiplexed user terminals, in addition to other parameters previously mentioned. Also, the reception scheme in the base station may be changed to a scheme that supports detection of multiple user terminals, such as a linear receiver that takes into consideration multi-user interference or non-linear multi-user detection (MUD) scheme.

The following describes operation of the base station (10). FIG. 4 illustrates operations of the base station (10). A step S1201 illustrates regularly checking by the base station (10) whether the uplink pilot signal is received.

Upon reception of the uplink pilot signal, the base station (10) calculates the first metric (S1202).

Then, the user terminal type is categorized according to the first metric (S1203).

After that, the base station (10) performs channel estimation based on the user terminal type (S1204).

After channel estimates are obtained, the base station (10) schedules uplink data transmission (S1205) and then transmits uplink data scheduling information to the user terminal (S1206).

The base station (10) regularly checks for uplink data from the user terminal (20) (S1207).

Once the uplink data are received, the base station (10) performs signal detection (S1208).

Figure 6:
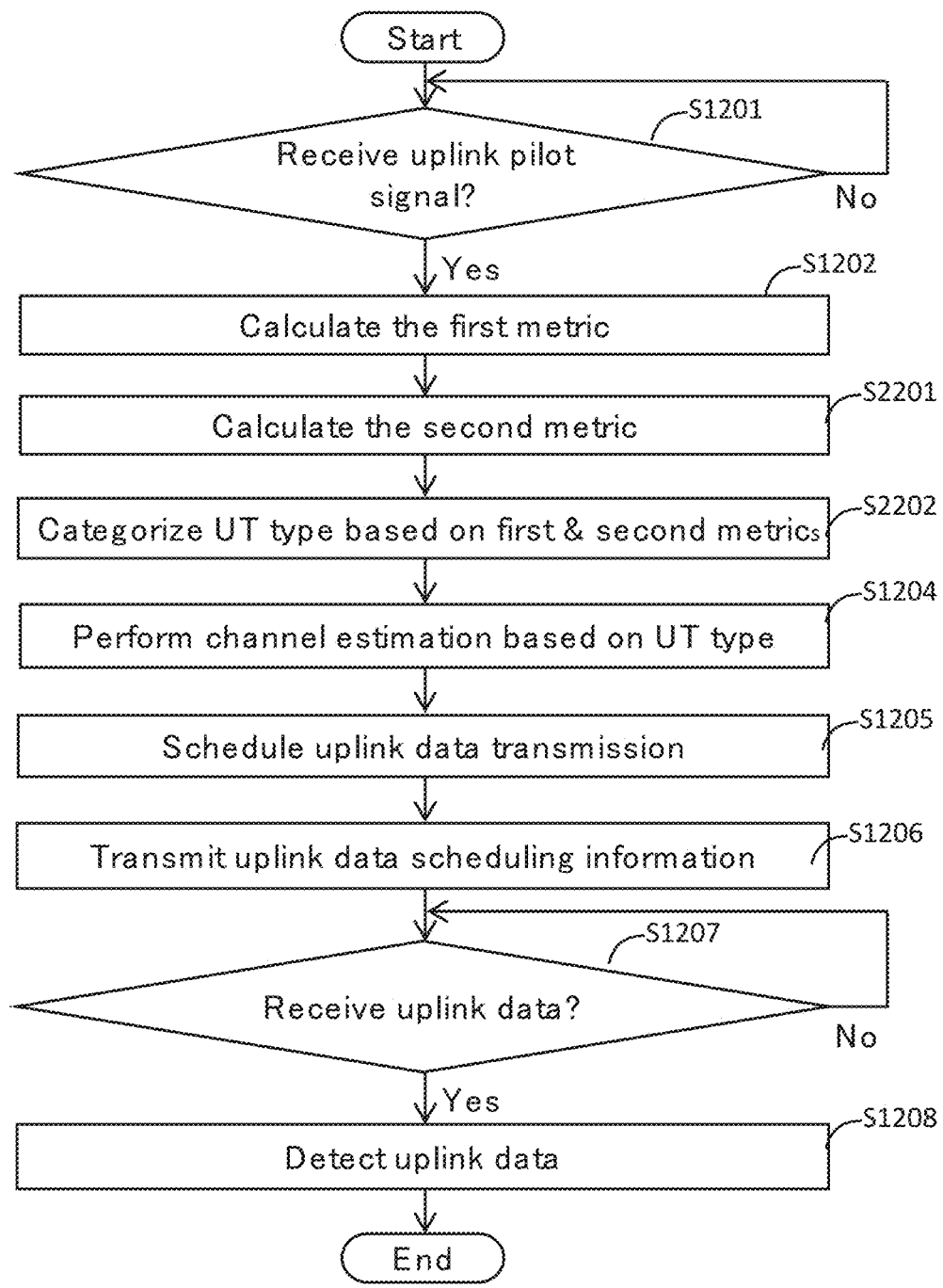
FIG. 6 is a flow diagram illustrating an example of operations of a base station in the second exemplary embodiment.

Since the detail of each operation in FIG. 6 has already been described, they are omitted for conciseness.

The first metric represents condition of a propagation environment between the base station (10) and the user terminal (20). Moreover, the first metric is used for adaptively selecting a channel estimation procedure. Therefore, the base station (10) can always ensure high channel estimation accuracy and maximum uplink data reception performance.

Second Exemplary Embodiment

In a second exemplary embodiment, one addition and one modification to the first exemplary embodiment are provided. That is, in the second exemplary embodiment, a second metric is introduced in addition to the first metric.

The second metric represents a received SNR of the uplink pilot signal when it is assumed that beamforming is applied. Based on such addition, the categorization of user terminal into two types is made based on a comparison result between the first metric and the second metric.

More specifically, if the first metric is less than the second metric, the user terminal (20) is categorized as the first type. Otherwise, the user terminal (20) is categorized as the second type.

With the addition and the modification, the second exemplary embodiment eliminates need to prepare in advance a predetermined threshold in the first exemplary embodiment. Therefore, the second exemplary embodiment is well suited for operations adapted to a change in an influential factor, such as number of predetermined beamforming directions or number of BS antennas (110).

Figure 5:
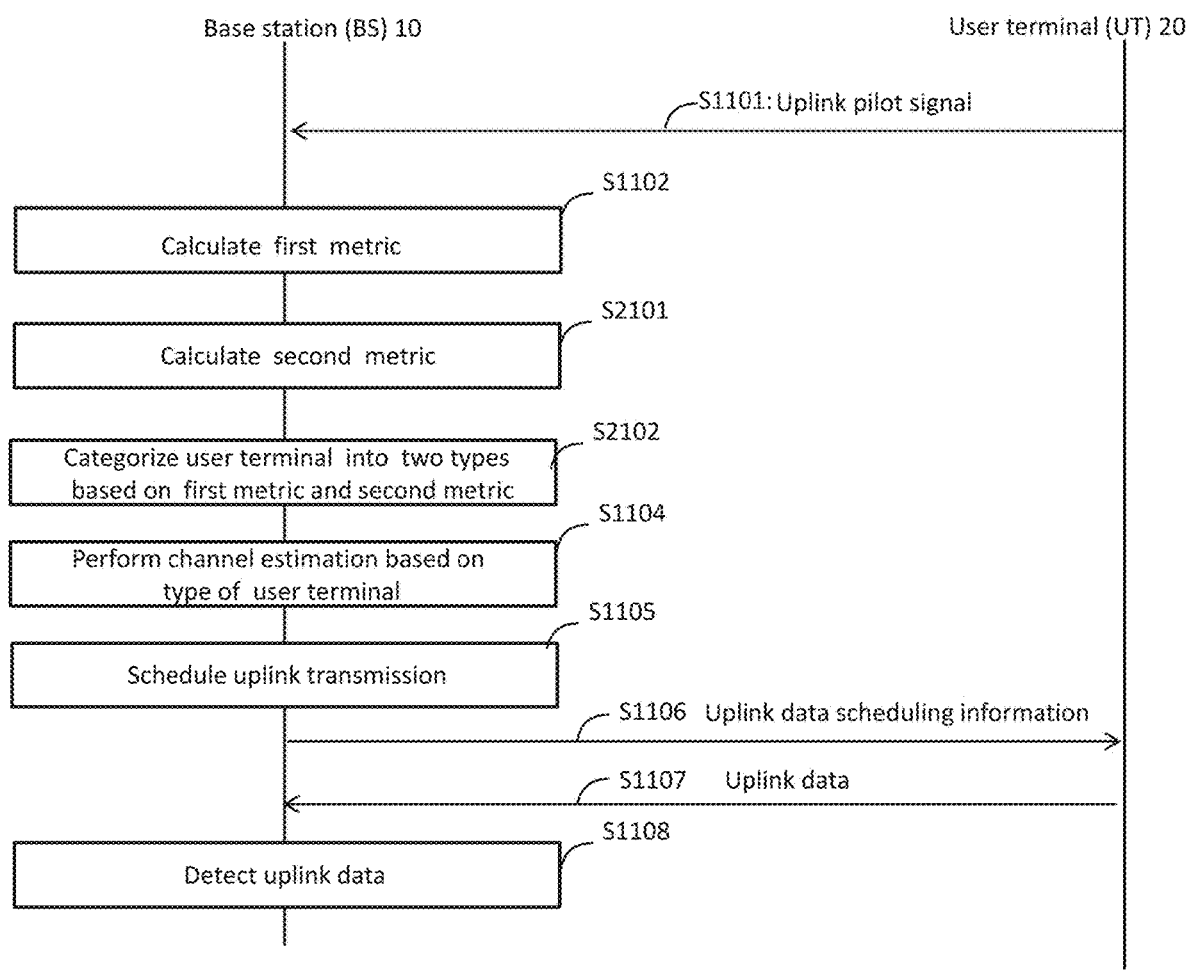
FIG. 5 is a diagram illustrating a sequence of operations in a second exemplary embodiment.

The following describes the second exemplary embodiment with reference to FIGS. 5 and 6. FIG. 5 illustrates sequences of the second exemplary embodiment. Similar to the first exemplary embodiment, the user terminal (20) transmits the uplink pilot signal to the base station (10) (S1101).

Then, the base station (10) calculates the first metric (S1102). In addition to the first metric, the base station (10) also calculates the second metric (S2101). The second metric represents the received SNR of the uplink pilot signal when it is assumed that beamforming is applied.

The following describes the calculation of the second metric, with reference to the example in FIG. 6.

Given N predetermined number of beamforming directions, the calculation of the second metric performs two steps.

The first step is to determine N directions that have the largest level of uplink pilot signal over noise.

The second step is to calculate the received SNR of the uplink pilot signal based on those directions.

The first step is the same as the one used for the beamforming channel estimation procedure in the first exemplary embodiment. Therefore, the first step in the second exemplary embodiment can also be expressed by Eq. 8.

The received SNR per subcarrier of the uplink pilot signal in the second step, which is denoted as $\gamma_{2nd}(k)$, can be expressed as follows.

$$\gamma_{2nd}(k) = \frac{\sum_{S=S_1}^{S_N} \langle |y_s(k)|^2 \rangle - \sigma_z^2 \sum_{S=S_1}^{S_N} |w(\theta_S)|^2}{\sigma_z^2 \sum_{S=S_1}^{S_N} |w(\theta_S)|^2} \quad \text{(Eq. 18)}$$

$$y_s(k) = w^T(\theta_S)y(k) \quad \text{(Eq. 19)}$$

where $w^T(\theta_S)$ and y(k) are given respectively in Eq. 9 and Eq. 2.

After the first metric and the second metric are calculated, the base station (10) categorizes the user terminal into two types by comparing the first metric and the second metric (S2102). The mathematical expression for this operation can be expressed as follows.

$$UT_{type} = \begin{cases} UT_{1st}, & \gamma_{1st}(k) < \gamma_{2nd}(k) \\ UT_{2nd}, & \gamma_{1st}(k) \geq \gamma_{2nd}(k) \end{cases} \quad \text{(Eq. 20)}$$

Next, the base station (10) performs channel estimation based on UT$_{type}$ (S1104).

After channel estimates are obtained, the base station (10) schedules uplink data transmission (S1105) and then transmits uplink data scheduling information to the user terminal (20) (S1106).

The user terminal (20), upon reception of the uplink data scheduling information, transmits uplink data to the base station (10) (S1107).

Finally, the base station (10) performs signal detection on the uplink data (S1108). Since the operations S1104 to S1108 are similar to the first exemplary embodiment, their explanations are omitted for conciseness.

Similar to the first exemplary embodiment, the second exemplary embodiment can be applied to various scenarios not limited to the examples given in this document.

FIG. 6 illustrates operation of the base station (10). Similar to the first exemplary embodiment, the base station (10) regularly checks whether the uplink pilot signal is received (S1201).

Upon reception of the uplink pilot signal, the base station (10) calculates the first metric (S1202).

In addition to the first metric, the base station (10) also calculates the second metric (S2201).

Then, the user terminal type is categorized according to the comparison result between the first metric and the second metric (S2202).

After that, the base station (10) performs channel estimation based on the user terminal type (S1204).

After the channel estimates are obtained, the base station (10) schedules uplink data transmission (S1205), and then transmits the uplink data scheduling information to the user terminal (S1206). The base station (10) regularly checks for the uplink data (S1207). Once the uplink data are received, the base station (10) performs detection (S1208).

Since the detail of each operation in FIG. 6 has already been explained in the previous subsections, they are omitted in this subsection for conciseness.

According to the second exemplary embodiment, in addition to providing the same advantageous effect as the first exemplary embodiment, need to prepare in advance a predetermined threshold in the first exemplary embodiment can be eliminated. This enables operations to be adaptively optimized to changes in influential factors such as number of predetermined beamforming directions or number of BS antennas.

Figure 9:
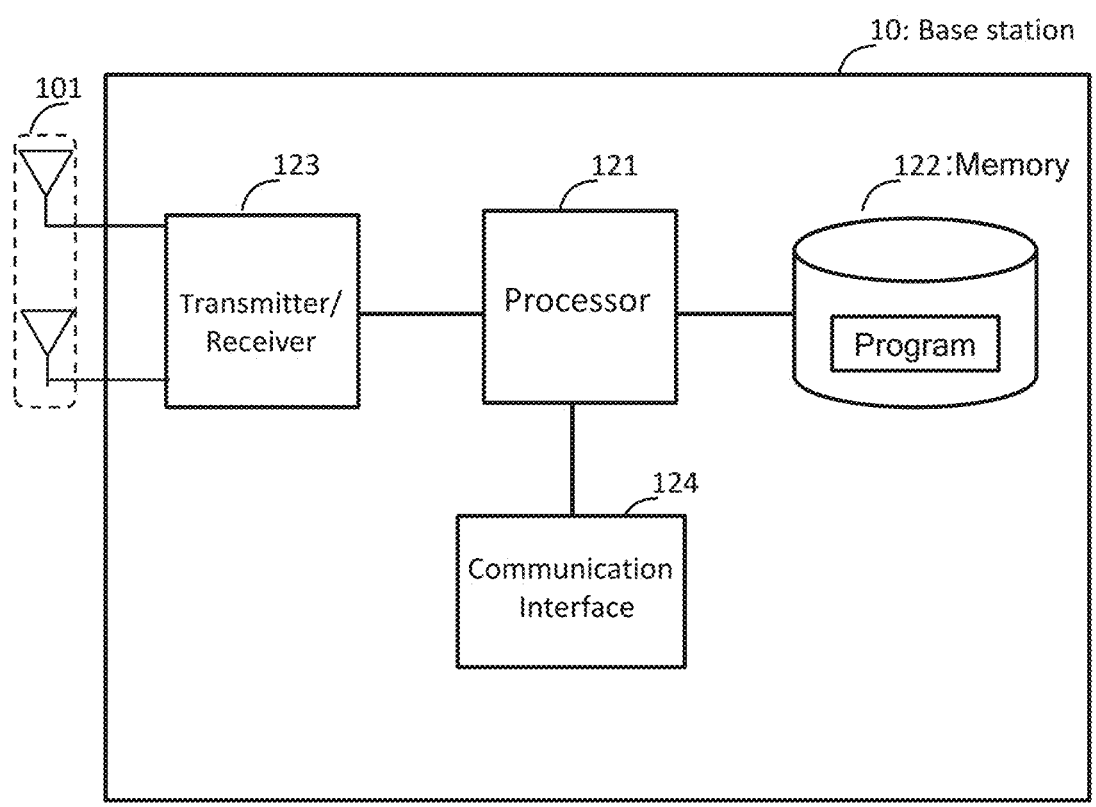
FIG. 9 is a diagram illustrating an example of a third exemplary embodiment.

Referring to FIG. 9 that illustrates an arrangement of the base station (10) in another exemplary embodiment, the base station (10) includes a processor (121) and a memory (122) that stores at least a program therein. The memory (122) is a non-transitory computer-readable storage medium. A transmitter/receiver (123) may include a baseband a processing unit (not shown) to perform modulation and demodulation and an RF (radio frequency) transmission/reception unit (not shown) to perform frequency conversion and transmit/receive an RF signal to/from a multiple antenna (101). A communication interface (124) is adapted to perform communication between the base station (10) and a core network node such as an serving gateway (SGW), a mobility management entity (MME) and/or one or more neighboring base stations using respective predetermined protocols. The processor (121) is so configured to execute a program loaded from the memory (122) to perform functions as described in the first or second exemplary embodiments.

Each disclosure of the above-listed Non Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element in each Supplementary Note, each element in each example, each element in each drawing, and the like) are possible within the scope of the claims of the present invention. That is, the present invention naturally includes various variations and modifications that could be made by those skilled in the art according to the overall disclosure including the claims and the technical concept.

What is claimed is:

1. A base station apparatus comprising:
   a plurality of antennas;
   a receiver that receives a signal from the plurality of the antennas;
   a processor connected to the receiver; and
   a memory connected to the processor and storing program instructions,
   wherein the processor, when executing the program instructions stored in the memory,
   calculates a first metric representing a signal quality of a pilot signal transmitted from a terminal and received by the plurality of the antennas;
   calculates a second metric representing a signal quality of the pilot signal with beamforming applied;
   categorizes the terminal based on comparison between the first metric and the second metric into at least two types; and
   for the terminal categorized as a first type, performs beamforming on the plurality of the antennas to a predetermined number of directions and then performs channel estimation for the beamformed directions, and, for the terminal categorized as a second type, performs channel estimation without performing beamforming on the plurality of the antennas.

2. The base station apparatus according to claim 1, wherein the processor calculates the first metric representing a signal quality of the pilot signal with beamforming unapplied.

3. A base station apparatus comprising:
   a plurality of antennas;
   a receiver that receives a signal from the plurality of the antennas;
   a processor connected to the receiver; and
   a memory connected to the processor and storing program instructions,
   wherein the processor, when executing the program instructions stored in the memory,
   calculates at least a first metric representing a signal quality of a pilot signal transmitted from a terminal and received by the plurality of the antennas;
   categorizes the terminal, based on the first metric; and
   for the terminal categorized as a first type, performs beamforming on the plurality of the antennas to a predetermined number of directions and then performs channel estimation for the beamformed directions, and, for the terminal categorized as a second type, performs channel estimation without performing beamforming on the plurality of the antennas, wherein the processor, when performing beamforming, determines beamforming weights for the predetermined number of directions corresponding to a predetermined number of largest levels of the pilot signal received.

4. The base station apparatus according to claim 3, wherein the processor, when beamforming is applied, obtains each of channel estimates for the predetermined number of directions, by multiplying a beamformed received signal with an inverse of the pilot signal, the beamformed received signal being obtained by summing for the number of the plurality of the antennas each result of multiplication of the received pilot signal received at each of the plurality of the antennas and a corresponding beamforming weight coefficient.

5. A method by a base station with a plurality of antennas, comprising:
   calculating a first metric representing a signal quality of a pilot signal transmitted from a terminal and received by the plurality of the antennas;
   calculating a second metric representing a signal quality of the pilot signal with beamforming applied;
   categorizing the terminal based on comparison between the first metric and the second metric into at least two types; and
   performing, for the terminal categorized as a first type, beamforming on the plurality of the antennas to a predetermined number of directions and then performing channel estimation for the beamformed directions, while, for the terminal categorized as a second type, performing channel estimation without performing beamforming on the plurality of the antennas.

6. The method according to claim 5, comprising
   calculating the first metric representing a signal quality of the pilot signal with beamforming unapplied.

7. A method by a base station with a plurality of antennas, comprising:
   calculating at least a first metric representing a signal quality of a pilot signal transmitted from a terminal and received by the plurality of the antennas;
   categorizing the terminal based on the first metric;
   performing, for the terminal categorized as a first type, beamforming on the plurality of the antennas to a predetermined number of directions and then performing channel estimation for the beamformed directions, while, for the terminal categorized as a second type, performing channel estimation without performing beamforming on the plurality of the antennas; and
   determining, when performing beamforming, weights for a predetermined number of directions corresponding to the predetermined number of largest levels of the pilot signal received.

8. A non-transitory computer-readable storage medium storing therein a program causing a computer included in a base station with a plurality of antennas, to execute:
   calculating a first metric representing a signal quality of a pilot signal transmitted from a terminal and received by the plurality of the antennas;
   calculating a second metric representing a signal quality of the pilot signal with beamforming applied;
   categorizing the terminal based on comparison between the first metric and the second metric into at least two types; and
   performing, for the terminal categorized as a first type, beamforming on the plurality of the antennas to a predetermined number of directions, and then performing channel estimation for the beamformed directions, while, for the terminal categorized as a second type, performing channel estimation without performing beamforming on the plurality of the antennas.

9. The non-transitory computer-readable storage medium according to claim 8, wherein the program stored in the non-transitory computer-readable storage medium, causes the computer to execute calculation of the first metric representing a signal quality of the pilot signal with beamforming unapplied.

10. A non-transitory computer-readable storage medium storing therein a program causing a computer included in a base station with a plurality of antennas, to execute:
   calculating at least a first metric representing a signal quality of a pilot signal transmitted from a terminal and received by the plurality of the antennas;
   categorizing the terminal based on the first metric;
   performing, for the terminal categorized as a first type, beamforming on the plurality of the antennas to a predetermined number of directions, and then performing channel estimation for the beamformed directions, while, for the terminal categorized as a second type, performing channel estimation without performing beamforming on the plurality of the antennas; and
   determining, when performing beamforming, weights for a predetermined number of directions corresponding to the predetermined number of largest levels of the pilot signal received.

* * * * *